United States Patent

Sprunger

Patent Number: 5,287,593
Date of Patent: Feb. 22, 1994

[54] SNOW AND ICE REMOVER

[76] Inventor: Tamae Sprunger, 20 Woodview La., Algonquin, Ill. 60102

[21] Appl. No.: 22,675

[22] Filed: Mar. 1, 1993

Related U.S. Application Data

[63] Continuation of Ser. No. 628,630, Dec. 17, 1990, Pat. No. 5,189,756.

[51] Int. Cl.$^5$ ............................................. B60S 1/54
[52] U.S. Cl. ........................................ 15/401; 15/322; 15/344; 15/405; 15/236.02; 37/230
[58] Field of Search ................. 15/236.02, 322, 401, 15/405; 37/230; 239/129, 130

[56] References Cited

U.S. PATENT DOCUMENTS

| | | | |
|---|---|---|---|
| 1,598,811 | 9/1926 | Ferrin | 15/236.01 X |
| 2,394,760 | 2/1946 | Felton | 15/405 X |
| 2,481,760 | 9/1949 | Leher | 15/401 X |
| 3,070,823 | 1/1963 | Heinig | 15/236.02 X |
| 4,366,368 | 12/1982 | Stephens | 15/405 X |
| 4,404,705 | 9/1983 | Thoma | 15/405 X |

FOREIGN PATENT DOCUMENTS

| | | | |
|---|---|---|---|
| 2927887 | 1/1981 | Fed. Rep. of Germany | 15/401 |
| 153646 | 9/1984 | Japan | 15/401 |

*Primary Examiner*—Chris K. Moore
*Attorney, Agent, or Firm*—Powell L. Sprunger

[57] ABSTRACT

A snow and ice remover having a scraper, and a device for passing a heated fluid along the scraper onto the ice.

14 Claims, 6 Drawing Sheets

SNOW AND ICE REMOVER

This is a continuation of application Ser. No. 628,630, filed Dec. 17, 1990, now U.S. Pat. No. 5,189,756.

BACKGROUND OF THE INVENTION

The present invention relates to snow and ice removers.

In the past, scrapers have been provided for removing ice and snow from the windshield of a vehicle. Typically, such scrapers have an elongated handle with a scraper attached to a distal end of the handle. Such scrapers have been found to be inadequate for the purpose of scraping the ice and snow from the windshield.

Quite frequently the ice which accumulates on the windshield is quite thick, and it is nearly impossible to remove the ice by a blade of the scraper. Often, the user must utilize a corner of the blade to make a number of channels in the ice and permit use of the scraper blade. The removal procedure by the scraper even in this case is very difficult and time consuming, and particularly in the cold environment of the weather is considerably uncomfortable since the removal procedure may require considerable time. In addition, the ice may not be completely removed by the scraper, and possibly poses a safety hazard in driving the car due to the loss of visibility through the windshield. Further, the blades of such scrapers are typically made of plastic which may break during use which causes additional inconvenience to the use since a new scraper must be obtained in order to complete the removal procedure.

SUMMARY OF THE INVENTION

A principle feature of the present invention is the provision of an ice and snow remover of simplified construction.

The remover of the invention comprises, a scraper having a distal blade, and means for passing fluid along the scraper towards the blade.

A feature of the invention is the provision of means for heating the fluid passing towards the blade.

Another feature of the invention is that the heated fluid melts the ice and snow in order to facilitate removal by the scraper.

Yet another feature of the invention is that the ice and snow is removed in a rapid and efficient manner by the remover.

Another feature of the invention is that the scraper minimizes the time required in the cold weather to remove the ice.

Still another feature of the invention is that the ice may be completely removed by the scraper in order to minimize the safety hazard due to incomplete removal of the ice, and thus greatly enhances visibility through the windshield.

Yet another feature of the invention is that the fluid may comprise air.

Another feature of the invention is that the fluid may comprise a liquid.

A further feature of the invention is that the scraper may comprise a metallic material for improved heat conductivity along the blade to facilitate melting of the ice.

A feature of the invention is that the remover minimizes the possibility of breakage of the scamper.

Further features will become more fully apparent in the following description of the embodiments of the invention and from the appended claims.

DESCRIPTION OF THE PREFERRED EMBODIMENTS

Figure 1:
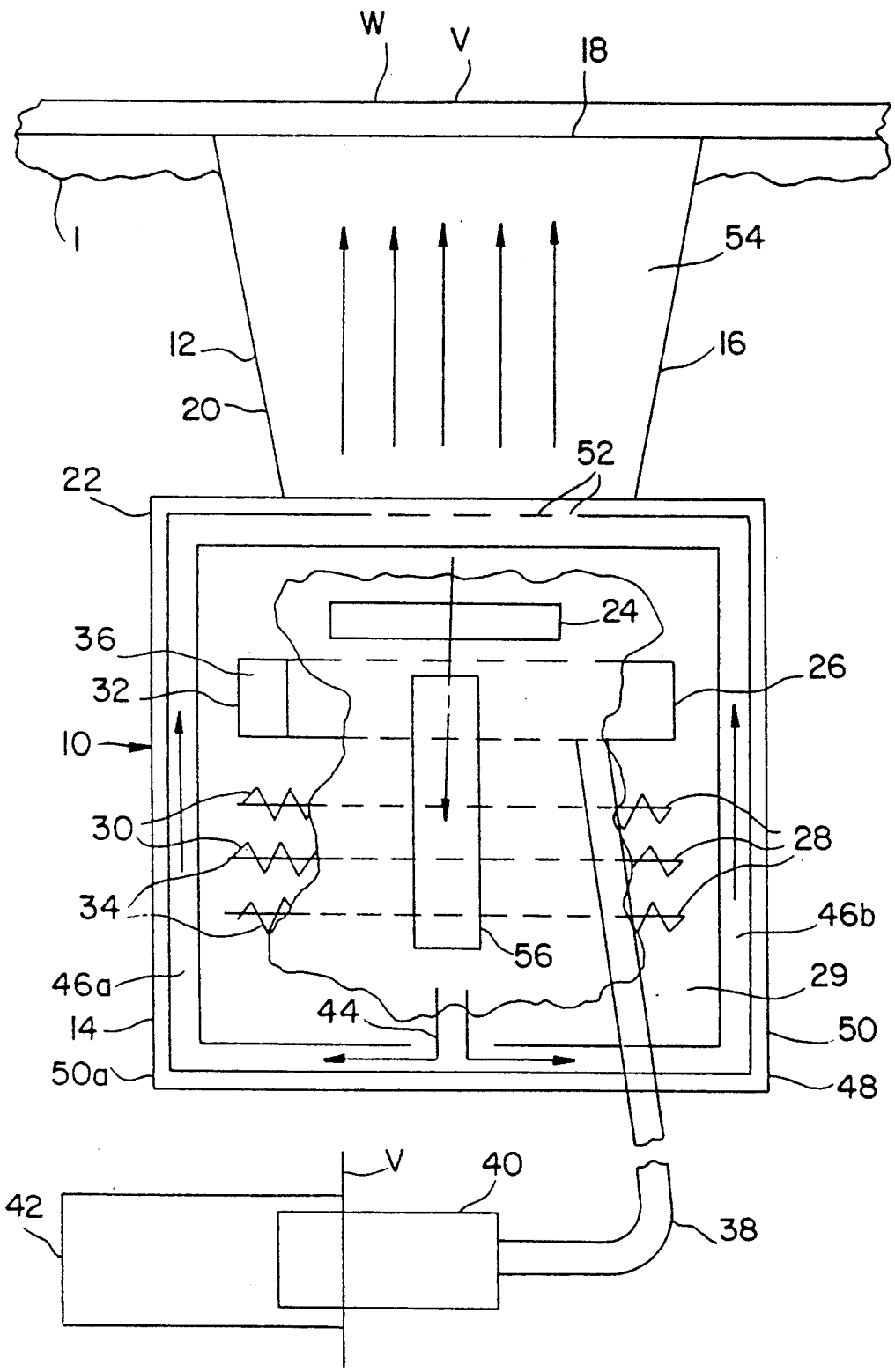
FIG. 1 is a plan view, partly broken away, of a snow and ice remover of the present invention.
Figure 2:
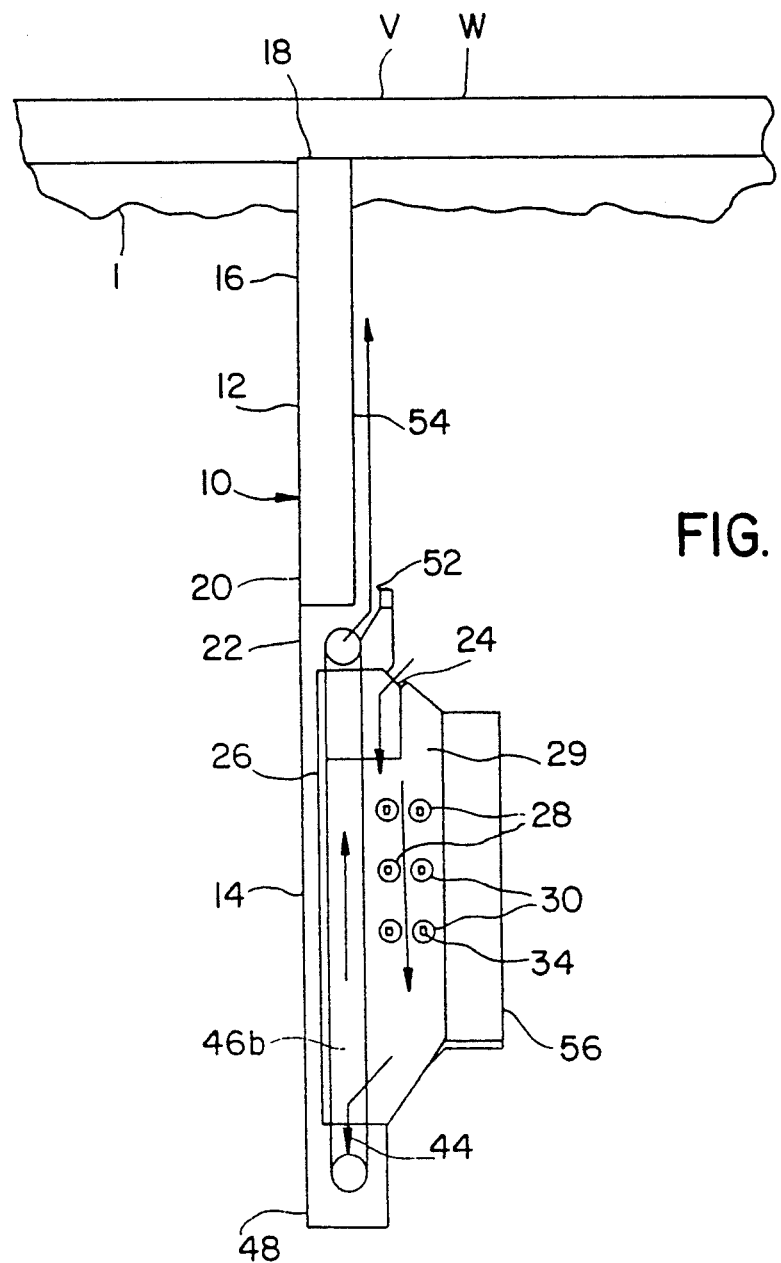
FIG. 2 is a side elevational view taken partly in section of the remover of FIG. 1.

Referring now to FIGS. 1 and 2, there is shown an ice and snow remover generally designated 10 for a windshield W of a Vehicle V having a scraper 12 extending from a body portion or body member 14. The scraper 12 has a distal blade 16 having a straight edge 18 for contacting the ice on the windshield W, and a proximal end 20 of the scraper 12 may be connected to a distal end 22 of the body portion 14. The scraper 12 may be made from a durable material such as metal which improves the strength and conductivity of heat along the scraper 12, or a suitable hard plastic material.

The body portion 14 has a central inlet 24 for receiving air, and a suitable pump or vacuum creating device 26 for drawing air from the atmosphere and passing the air over a plurality of heating members 28 located in a chamber 29 of the body portion 14. The heating members 28 may comprise heating coils 30 energized by a source of power 32 in order to heat the heating members 28 and the air as it passes over the coils 30, with the coils 30 having central support members 34 to insure the structural integrity of the coils 30. The power source 32 may comprise a suitable battery 36 in the body portion 14 which may be rechargeable in order to energize the heating members 28 and the pump 26. Alternatively, the remover 10 may have an electrical cord 38 connected to a remote plug 40 for insertion into a lighter socket 42 of the vehicle V in order to supply power from the vehicle V to the heating members 28 and pump 26. In addition, the plug 40 and socket 42 may be utilized to charge the rechargeable battery 36 while the remover 10 is stored in the vehicle while the remover is not in use.

The body portion 14 has an opening 44 communicating between the chamber 29 and a pair of channels 46a and 46b which extend from a distal portion 48 of the body member 14 around opposed sides 50a and 50b of the body portion 14 to a plurality of apertures 52 located in the distal end 22 of the body portion 14, with the apertures 52 being directed towards the blade 16 adjacent the ice I on the windshield W. The channels 46a and b may have a relatively small diameter in order to enhance the velocity of the fluid passing through the apertures 52.

Thus, in accordance with the present invention the ice remover 10 removes air from the atmosphere by the pump 26 and passes the air over the heating members 28. The pump 26 then passes the heated air through the opening 44, channels 46a and b and through the apertures 52 along an exterior surface 54 of the scraper 12 and against the ice I adjacent the blade 16 on the ice I. In this manner, the snow and ice I on the windshield W of the vehicle V is melted by the heated air in order to greatly facilitate removal of the ice I by the scraper 12 which co-operates with the heated air. The remover 10 thus heats and melts the ice while the scraper 12 may be applied against the ice I in order to complete its removal. The remover 10 greatly enhances the ease of complete removal of the ice and snow from the windshield while minimizing the time consumed and difficulty of the ice removal, and also minimizes the possibility of breakage of the scraper 12. As shown, the body portion 14 may be formed in the configuration of a handle 56 to facilitate manipulation of the scraper 12 during removal of the ice I. The scraper 12 may be positioned in a manner to direct the heated fluid against the ice in order to melt the ice before scraping.

Figure 3:
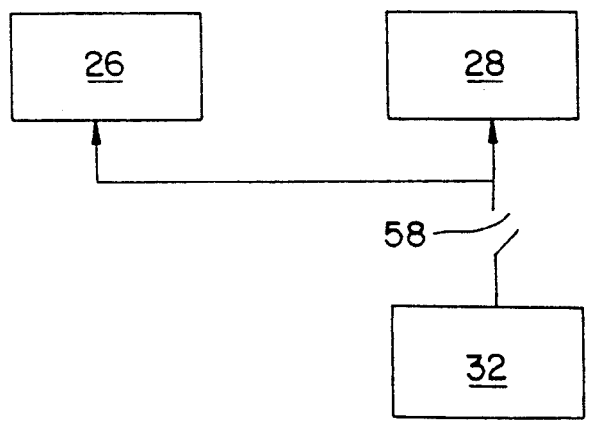
FIG. 3 is a block diagram of an electrical circuit for the remover of the present invention.

An electrical circuit for the remover 10 is shown in FIG. 3. The remover 10 has a suitable switch 58 in order to connect the power 32 to the heating members 28 and pump 26 and result in heating and pumping the heated air through the remover 10 onto the ice I.

Figure 4:
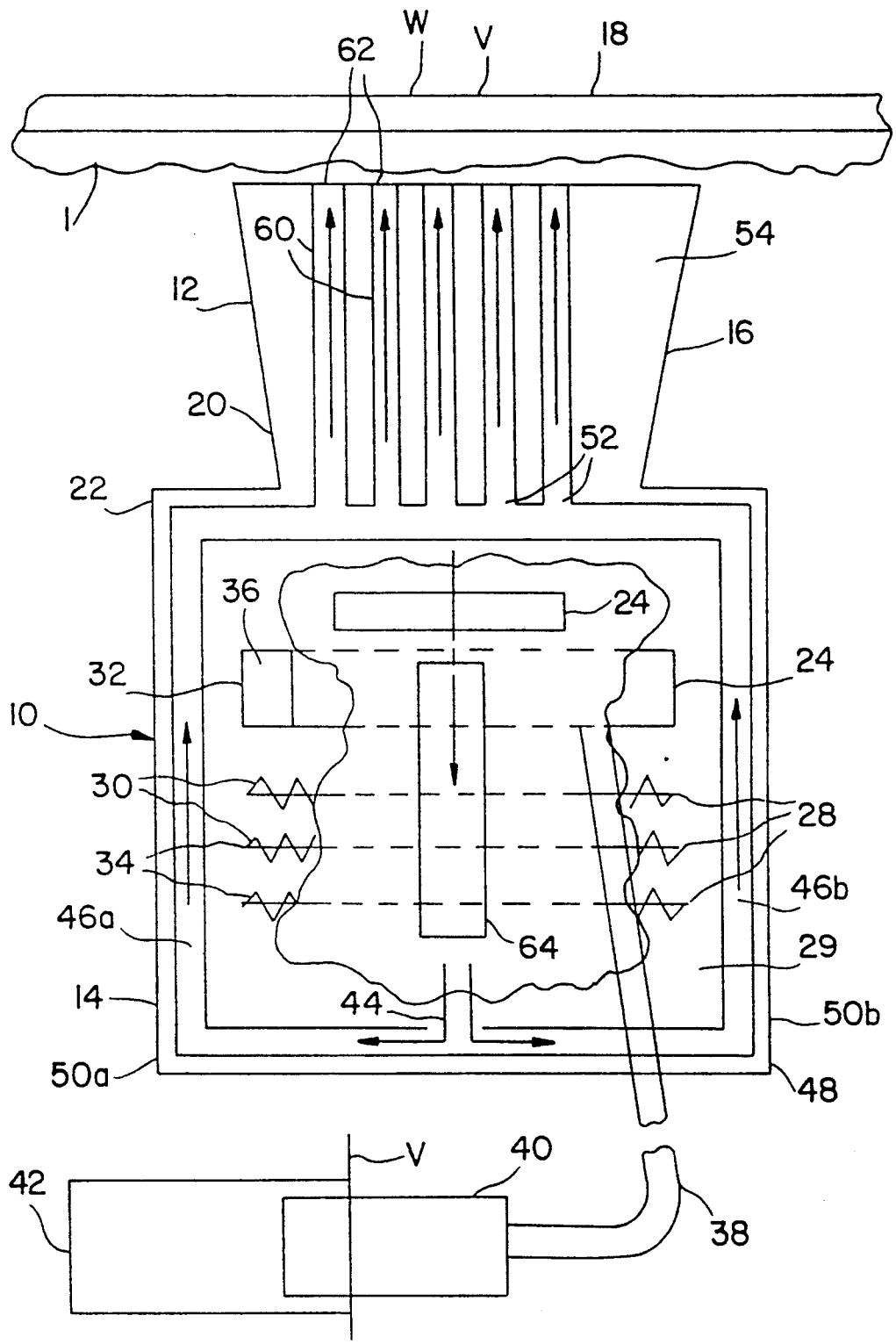
FIG. 4 is a plan view of another embodiment of a scraper for the remover of FIG. 1.
Figure 5:
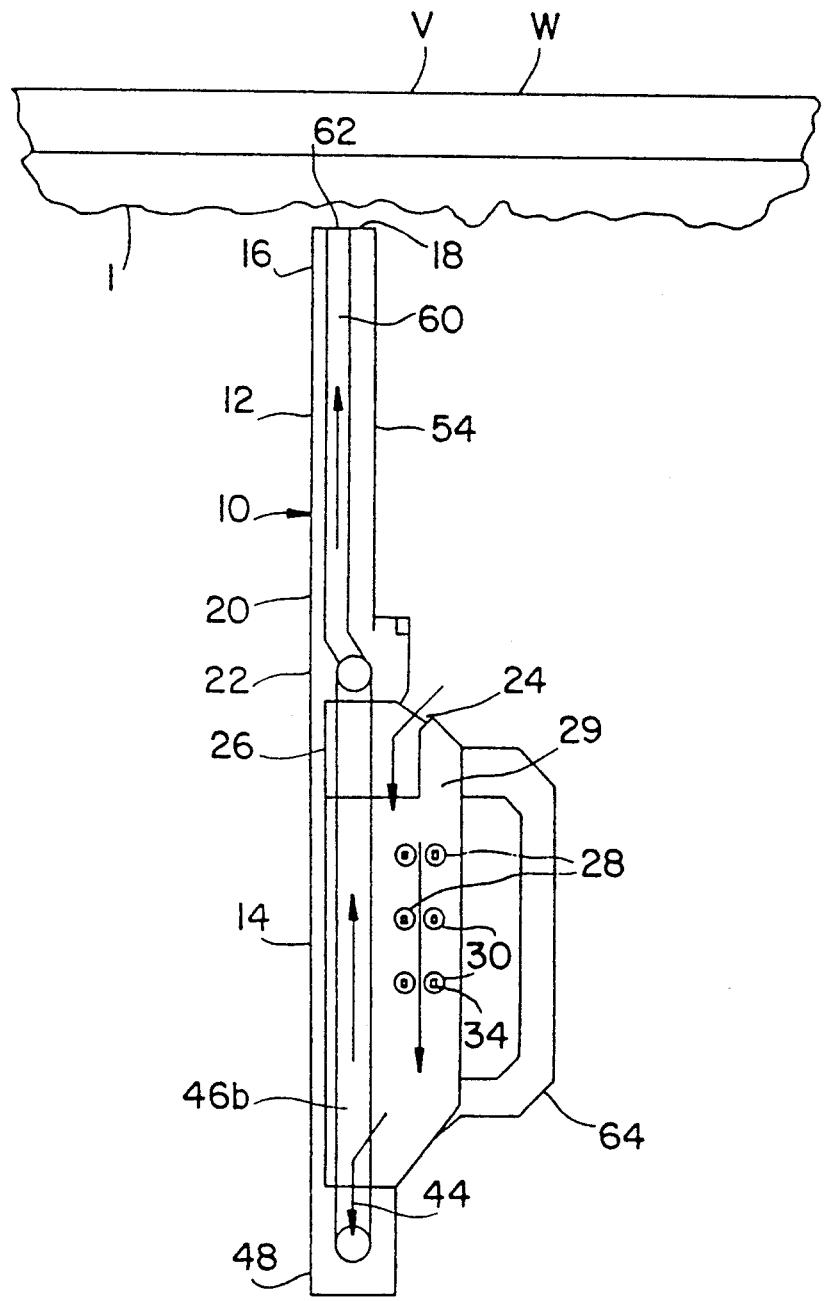
FIG. 5 is an elevational view taken partly in section of the scraper of FIG. 4.

Another embodiment of the present invention is illustrated in FIGS. 4 and 5, in which like reference numerals designate like parts. In this embodiment the scraper 12 has a plurality of channels 60 extending through the scraper 12 to the blade 16, with the distal end of the scraper 12 adjacent the blade 16 having a plurality of openings 62 communicating with the channels 60 and being directed towards the ice. The proximal ends of the channels 60 are connected to the channels 46a and b of the body member 14 in order to establish communication between the body portion 14 and scraper 12. Thus, the heated air is passed through the channels 60 of the scraper 12 and onto the ice in order to melt the ice while the scraper 12 is applied to the ice. In addition, the body portion 14 may have an arcuate handle 64 in order to permit manipulation of the scraper 12 and heated air during removal of the ice and snow from the windshield. If desired, during use the scraper 12 may be applied to the windshield after the ice has melted a sufficient amount by the heated air.

Figure 6:
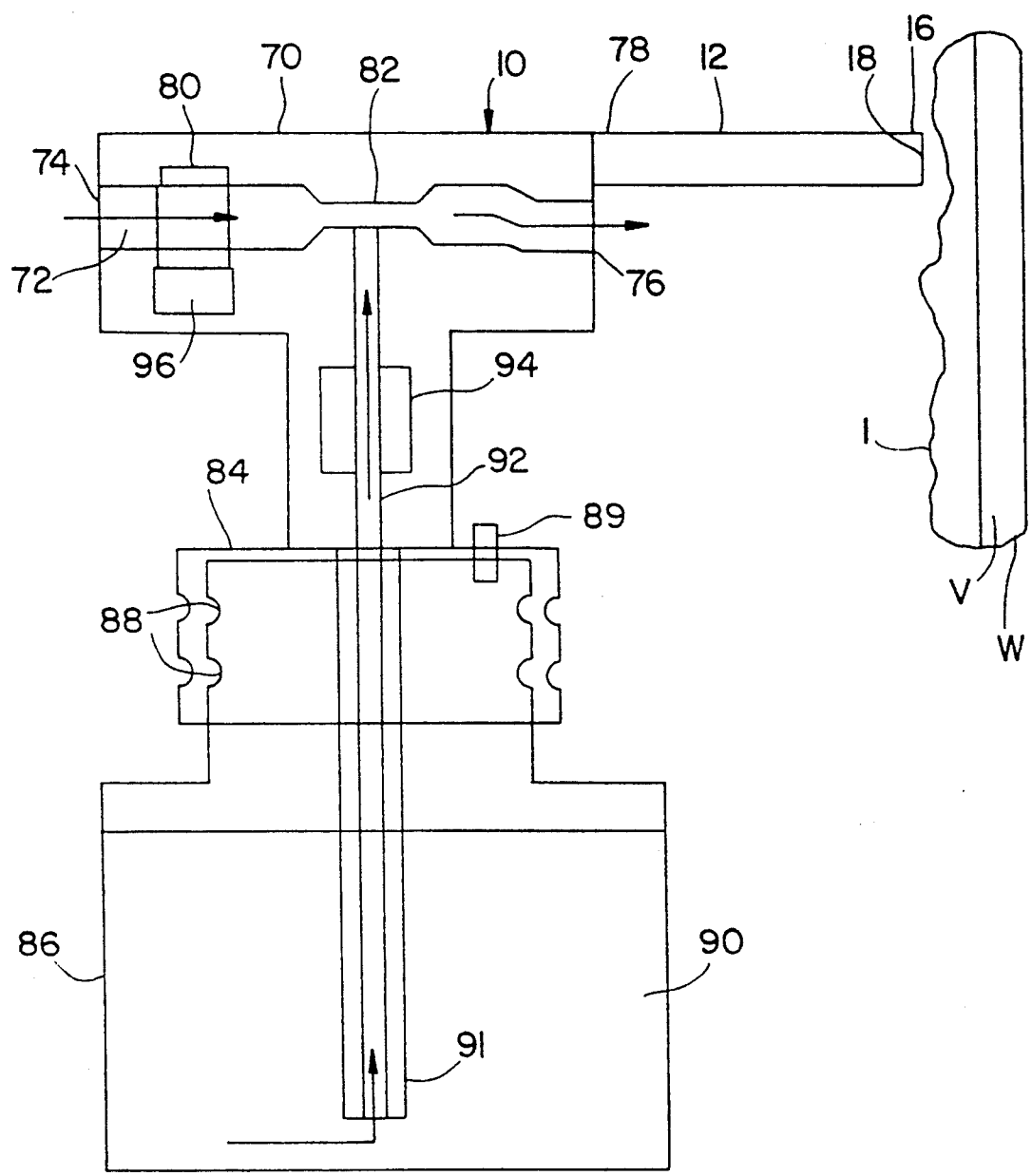
FIG. 6 is a sectional view of another embodiment of the remover of the present invention.

Another embodiment of the present invention is illustrated in FIG. 6, in which like reference numerals designate like parts. In this embodiment, the remover 10 has a connecting member 70 and a scraper 12 of the type previously discussed in connection with FIG. 1. The connecting member 70 has a passageway 72 having a port 74 communicating with the atmosphere, and a plurality of apertures 76 adjacent the proximal end 78 of the scraper 12 and being directed towards the blade 16 of the scraper 12. The remover 10 has a pump 80 for drawing air from the atmosphere, and passing the air through the passageway 72 to the apertures 76. As shown, the passageway 72 has central portion 82 of reduced dimensions to form a venturi, as discussed below.

The connecting member 70 has a threaded lower lid 84 to releasably retain a hollow receptacle 86 by suitable threads 88 on an upper neck of the receptacle 86 in order to releasably attach the receptacle 86 to the lid 84. The receptacle has a receptacle cavity 90 to retain a source of liquid L, such as water. As shown, the connecting member 70 has a bore 92 communicating between the cavity 90 and the central portion 82 of the passageway 72 or venturi. Also, the connecting member 70 has a heating member 94 adjacent the bore 92 of the connecting member 70 in order to heat the liquid L as it passes through the bore 92 to the passageway 72. The lid 84 has a vent 89 in order to permit passage of air from the atmosphere into the cavity 90. The connecting member 70 has a tube 91 extending from the bore 92 to a lower part of the cavity 90.

In use, the pump 80 draws air from the atmosphere under a vacuum, and passes the air through the passageway 72 and through the apertures 76 to the distal end of the scraper 12 adjacent the blade 16. The air passing through the venturi or central portion 82 of the passageway 72 draws liquid L from the cavity 90 of the receptacle 86. The air is heated by the heating member 94 as it passes through the bore 92 into the passageway 72. The heated liquid L is entrained in the air passing through the passageway 72 and through the apertures 76 to the distal blade 16 of the scraper 12. Thus, the remover 10 passes a heated humidified air containing the liquid L towards the blade 16 of the scraper 12 and onto the ice and snow in order to melt the ice preparatory to or during scraping by the scraper 12. The remover 10 has a source of power 96, such as a battery or plug for energization by the power of the vehicle, for supplying power to the pump 80 and heating member 94 in a manner as previously described. In this manner, the remover of FIG. 6 directs a heated mixture of air and liquid onto the ice on the windshield of the vehicle in order to melt the ice and facilitate its removal by the scraper 12.

Figure 7:
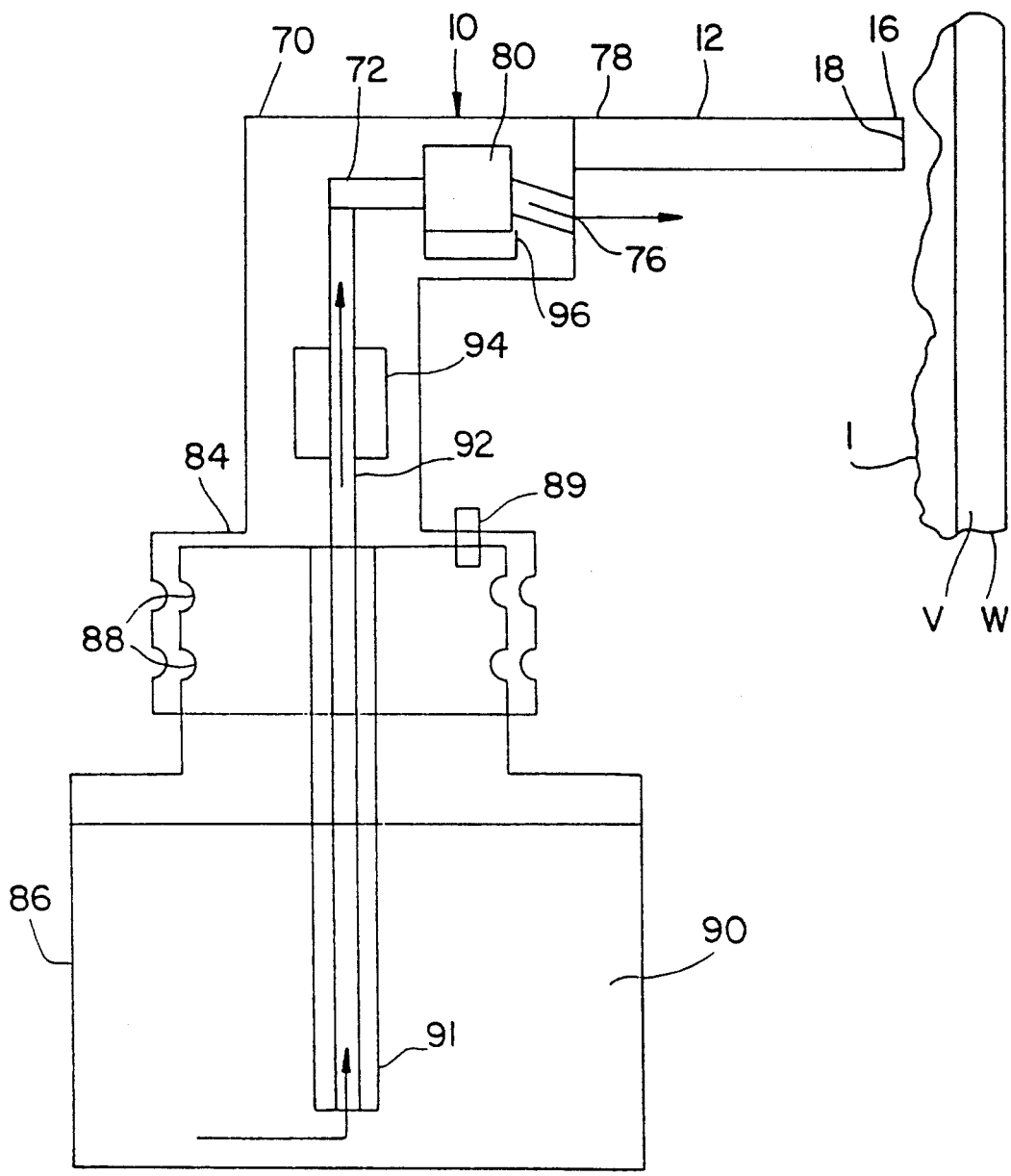
FIG. 7 is a sectional view of another embodiment of the remover of the present invention.

Another embodiment of the remover of the present invention is illustrated in FIG. 7, in which like reference numerals designate like parts. In this embodiment, the pump 80 is located in the bore 92 or passageway 72 of the connecting member 70, and the passageway 72 is closed to the atmosphere in order to draw the liquid L through the bore 92 into the passageway 72 where it is pumped through the apertures 72 and past the blade 16 of the scraper 12 onto the ice. The liquid L, such as water, is heated by the heating member 94 as it passes through the bore 92, such that the remover 10 of FIG. 7 passes and directs a heated liquid to a location adjacent the distal blade 16 of the scraper 12 in order to melt the ice and snow while it is being scraped and thus facilitate the removal of the ice and snow. In other respects, the remover of FIG. 7 operates in a manner as previously described in connection with FIGS. 1 and 6.

The foregoing detailed description of the embodiments of this invention are given for clearness of understanding only, as modifications will be obvious to those skilled in the art.

What is claimed is:

1. A snow and ice remover for a surface, comprising:
   a housing having an outer end;
   a scraper mounted on the outer end of the housing for contacting the ice on the surface, and having an elongated relatively wide flat blade having an outer scraping edge;
   means in the housing for passing air along the scraper and onto the ice; and
   means in the housing for heating the air and directing the heated air through a central portion of the blade past the outer edge to melt the ice and facilitate removal of the ice.

2. The remover of claim 1 wherein the heating means comprises at least one heating member for heating the air as it passes over the heating member.

3. The remover of claim 2 wherein the passing means comprises a pump for passing air over the heating member and through the scraper.

4. The remover of claim 1 including a handle generally aligned with the scraper for manipulating the remover and facilitate scraping by the scraper.

5. The remover of claim 1 in which the scraper is constructed from a metallic material.

6. The remover of claim 1 including means for supplying power to the passing and heating means.

7. The remover of claim 6 wherein the supplying means comprises a battery.

8. The remover of claim 7 wherein the battery is rechargeable.

9. The remover of claim 6 wherein the supplying means comprises means for connecting the passing and heating means to the power supply of the vehicle.

10. A snow and ice remover for a windshield of a vehicle, comprising:
- a scraper having an outer blade for contacting the ice on the windshield, and having an inner end portion;
- a body member extending from the inner end portion of the scraper and having a pair of channels extending from an inner portion of the body member along opposed sides of the body member towards the inner portion of the scraper, said body member having a plurality of apertures communicating with an outer portion of the channels and being directed towards the blade of the scraper;
- means for heating air in the body member intermediate the opposed channels; and
- means for drawing the air from the atmosphere and passing the air over the heating means and into inner portions of the channels for passage to the apertures.

11. The remover of claim 1 wherein the blade has a plurality of laterally disposed channels extending through the blade and past the edge, with the channels extending longitudinally through the blade.

12. The remover of claim 11 wherein the blade has a plurality of outer openings communicating with the channels and located adjacent the outer edge of the blade.

13. The remover of claim 1 wherein the scraper blade is mounted at a fixed position on the housing.

14. The remover of claim 13 in which the blade is integral with the housing.

* * * * *